US012609231B2

(12) United States Patent
Yamamoto

(10) Patent No.: US 12,609,231 B2
(45) Date of Patent: Apr. 21, 2026

(54) REACTOR, CONVERTER, AND POWER CONVERSION DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Shinichiro Yamamoto, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 904 days.

(21) Appl. No.: 17/802,271

(22) PCT Filed: Feb. 26, 2021

(86) PCT No.: PCT/JP2021/007536
§ 371 (c)(1),
(2) Date: Aug. 25, 2022

(87) PCT Pub. No.: WO2021/177189
PCT Pub. Date: Sep. 10, 2021

(65) Prior Publication Data

US 2023/0100669 A1 Mar. 30, 2023

(30) Foreign Application Priority Data

Mar. 2, 2020 (JP) ................................. 2020-035394

(51) Int. Cl.
*H01F 27/24* (2006.01)
*H01F 1/20* (2006.01)
(Continued)

(52) U.S. Cl.
CPC ............... *H01F 27/24* (2013.01); *H01F 1/20* (2013.01); *H01F 27/08* (2013.01); *H01F 27/327* (2013.01); *H01F 30/12* (2013.01)

(58) Field of Classification Search
None
See application file for complete search history.

(56) References Cited

U.S. PATENT DOCUMENTS 3,209,294 A * 9/1965 Cornell .................. H01F 29/10 336/134
2007/0159289 A1 * 7/2007 Lee ......................... H01F 27/24 336/212
(Continued)

FOREIGN PATENT DOCUMENTS

JP H06-013243 A 1/1994
JP 2000-294429 A 10/2000
JP 2013-074062 A 4/2013

OTHER PUBLICATIONS

International Search Report issued on May 11, 2021 for WO 2021/177189 A1 (4 pages).

*Primary Examiner* — Mang Tin Bik Lian
(74) *Attorney, Agent, or Firm* — Venjuris, P.C.

(57) ABSTRACT

Provided is a reactor including a coil and a magnetic core. The coil includes a winding portion, the number of winding portions is one, the winding portion has a rectangular tubular shape, the magnetic core is an assembly obtained by combining a first core portion and a second core portion, and the first core portion and the second core portion are constituted by compacts made of different materials.

14 Claims, 7 Drawing Sheets

(51) Int. Cl.

| | |
|---|---|
| ***H01F 27/08*** | (2006.01) |
| ***H01F 27/32*** | (2006.01) |
| ***H01F 30/12*** | (2006.01) |

(56) References Cited

U.S. PATENT DOCUMENTS

| | | | | |
|---|---|---|---|---|
| 2014/0085035 | A1* | 3/2014 | Kim | H01F 27/24<br>336/212 |
| 2017/0352476 | A1* | 12/2017 | Inaba | H01F 27/324 |
| 2018/0122550 | A1* | 5/2018 | Inaba | H01F 27/263 |
| 2018/0286580 | A1* | 10/2018 | Tanahashi | B29C 65/4835 |
| 2019/0131052 | A1* | 5/2019 | Kusawake | H01F 27/022 |
| 2020/0118726 | A1* | 4/2020 | Miyamoto | H01F 27/263 |

* cited by examiner

REACTOR, CONVERTER, AND POWER CONVERSION DEVICE

CROSS REFERENCE TO RELATED APPLICATIONS

This application is a national phase of PCT application No. PCT/JP2021/007536, filed on 26 Feb. 2021, which claims priority from Japanese patent application No. 2020-035394, filed on 2 Mar. 2020, all of which are incorporated herein by reference.

TECHNICAL FIELD

The present disclosure relates to a reactor, a converter, and a power conversion device.

This application claims priority on Patent Application No. 2020-035394 filed in Japan on Mar. 2, 2020, the entire contents of which are hereby incorporated by reference.

BACKGROUND

The reactor of Patent Document 1 includes a coil, a magnetic core, a case, and a cooling pipe. The coil is obtained by helically winding a winding wire. The number of coils is one, and the coil has a cylindrical shape. The magnetic core includes an inner core portion and an outer core portion. The inner core portion is disposed inside the coil. The outer core portion covers both end surfaces of the inner core portion, and both end surfaces and an outer peripheral surface of the coil. The inner core portion and the outer core portion are made of different materials. Specifically, the inner core portion is constituted by a powder compact, and the outer core portion is constituted by a compact made of a composite material. The case accommodates an assembly of the coil and the magnetic core. The assembly can be accommodated in the case by placing the coil and the inner core portion in the case, filling the case with raw materials of the composite material, and curing the raw materials. A refrigerant flows through the cooling pipe. The cooling pipe is helically wound around the case in the circumferential direction of the case so as to be in contact with the outer peripheral surface of the case.

PRIOR ART DOCUMENT

Patent Document

Patent Document 1: JP 2013-074062 A

SUMMARY OF THE INVENTION

Problems to be Solved

A reactor according to this disclosure is a reactor including a coil and a magnetic core, in which the coil includes a winding portion, the number of winding portions is one, the winding portion has a rectangular tubular shape, the magnetic core is an assembly obtained by combining a first core portion and a second core portion, and the first core portion and the second core portion are constituted by compacts made of different materials.

A converter according to this disclosure includes the reactor of this disclosure.

A power conversion device according to this disclosure includes the converter of this disclosure.

DETAILED DESCRIPTION TO EXECUTE THE INVENTION

Figure 1:
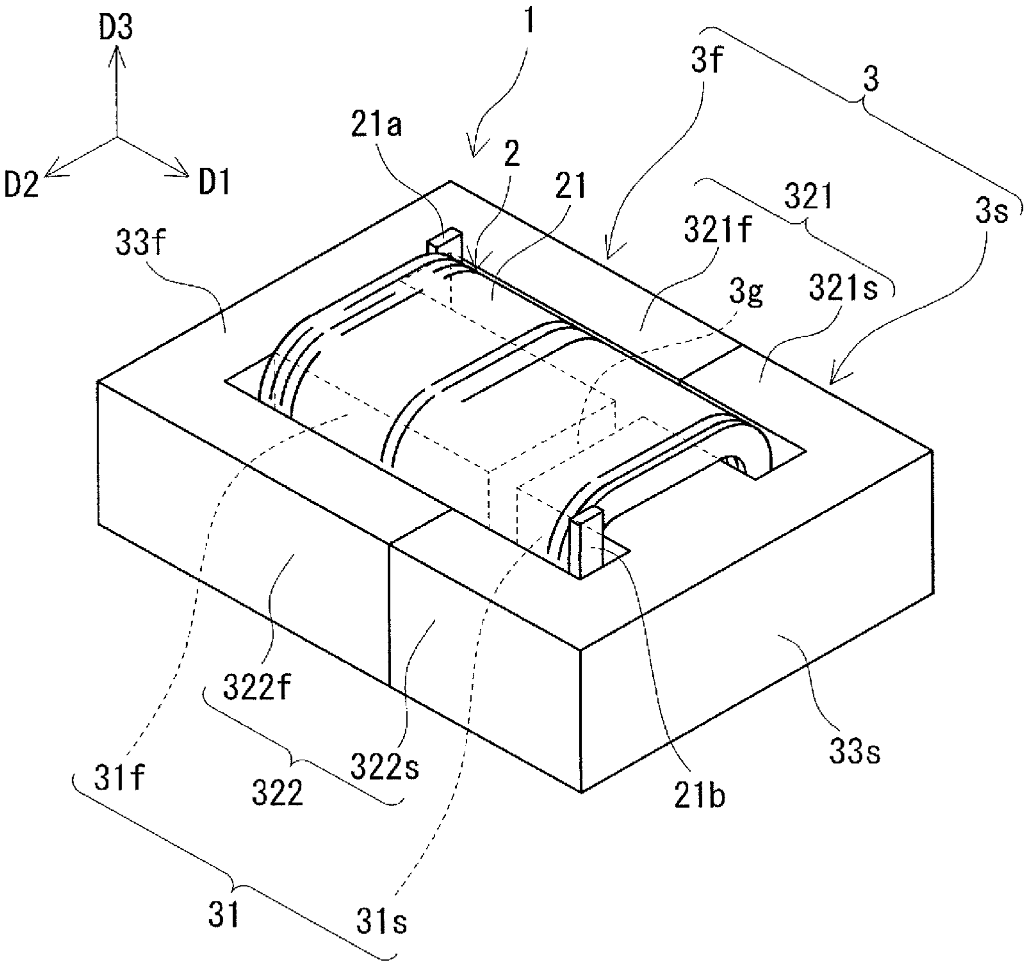
FIG. 1 is a perspective view schematically showing the entire reactor according to Embodiment 1.

Problems to be Solved by the Present Disclosure

Because the inner core portion and the outer core portion are made of different materials in the assembly, the inductance can be easily adjusted. On the other hand, because the coil and the inner core portion are embedded in the outer core portion in the assembly, heat dissipation cannot be easily adjusted. This is because the surface of the assembly is substantially made of only a constituent material of the outer core portion. Further, the above assembly has low heat dissipation. This is because the outer core portion is made of a composite material, and has comparatively low heat conductivity. In view of this, as a result of the assembly being accommodated in the case around which the cooling pipe is wound, the above reactor enhances the heat dissipation performance of the assembly. However, because the cooling pipe is wound around the case, the size of the reactor is increased.

An object of this disclosure is to provide a reactor that can easily adjust inductance and heat dissipation without increasing the size of the reactor. Also, another object of this disclosure is to provide a converter provided with the above reactor. Further, another object of this disclosure is to provide a power conversion device provided with the above converter.

Advantageous Effects of the Present Disclosure

A reactor according to this disclosure can easily adjust inductance and heat dissipation without increasing the size of the reactor.

A converter according to this disclosure and a power conversion device according to this disclosure have excellent heat dissipation without increasing the size of the converter and the size of the power conversion device.

Description of Embodiments of the Present Invention

First, embodiments of this disclosure will be listed and described.

(1) A reactor according to one aspect of this disclosure is a reactor including a coil and a magnetic core, in which the coil includes a winding portion, the number of winding portions is one, the winding portion has a rectangular tubular shape, the magnetic core is an assembly obtained by combining a first core portion and a second core portion, and the first core portion and the second core portion are constituted by compacts made of different materials.

The reactor can easily adjust inductance. In particular, the reactor can easily adjust inductance without a large gap portion being interposed between the first core portion and the second core portion. This is because the magnetic core is not made of a single material, but is constituted by a first core portion and a second core portion constituted by compacts made of different materials.

The reactor can more easily adjust heat dissipation, compared to the above-described conventional reactor. A magnetic core of a conventional reactor is obtained by embedding a core portion having a comparatively high heat conductivity in a core portion having a comparatively low heat conductivity. That is, this is equivalent to the surface of this magnetic core being made of a single material. In contrast, in the above reactor, the first core portion and the second core portion, which constitute a magnetic core, are constituted by compacts made of different materials, and thus the surface of the magnetic core can be made of different materials.

The reactor can more easily enhance heat dissipation, compared to the above-described conventional reactor. In the above-described conventional reactor, the surface of the magnetic core is constituted by only a core portion having comparatively low heat conductivity as described above. In contrast, as described above, the surface of the magnetic core can be made of different materials in the above reactor, and thus the surface of the magnetic core can include a surface made of a material having excellent heat dissipation.

The above reactor can be suitably used for a reactor that is cooled by a cooling member having uneven cooling performance. Out of the first core portion and the second core portion, the core portion having higher heat dissipation is disposed on the side where the cooling member has low cooling performance, and the core portion having lower heat dissipation is disposed on the side where the cooling member has high cooling performance As a result, the first core portion and the second core portion are evenly cooled, and the highest temperature of the magnetic core is reduced. Because the highest temperature of the magnetic core is reduced in this manner, the above reactor has low loss.

The reactor tends not to increase in size. This is because heat dissipation can be easily adjusted and increased as described above, and thus the above reactor need not be provided with a cooling pipe as in the above-described conventional reactor.

The number of winding portions is one in the above reactor, and thus, compared with the case where a plurality of winding portions are arranged in parallel in a direction orthogonal to an axial direction of the winding portions, the installation area in the direction of arrangement can be reduced.

Because the winding portion has a rectangular tubular shape in the above reactor, the contact area of the winding portion with an installation target can be more easily increased, compared to a case where the winding portion has a cylindrical shape having the same cross-sectional area. Thus, the reactor tends to dissipate heat to the installation target via the winding portion. Also, the winding portion can be easily installed stably on the installation target in the reactor.

The reactor can be more easily manufactured, compared to the above-described conventional reactor. The above-described conventional reactor is manufactured by filling the assembly obtained by combining the coil and a middle core portion, with the raw material of a composite material, and curing the raw material. At this time the composite material needs to be sufficiently spread over an outer periphery of the assembly, and it is difficult to produce a side core portion. In contrast, the first core portion and the second core portion, which are pre-produced, need only be attached to the coil. The first core portion and the second core portion can be easily produced because nothing needs to be filled into the coil or the other core portions.

(2) According to one aspect of the above reactor, a relative magnetic permeability of the first core portion is smaller than a relative magnetic permeability of the second core portion.

Because the first core portion and the second core portion satisfy the above magnitude relationship regarding relative magnetic permeability, the reactor can easily adjust inductance without a large gap portion being interposed between the first core portion and the second core portion. Also, because the reactor does not require a gap portion to be interposed between the first core portion and the second core portion, it is possible to easily reduce eddy current loss occurring in the winding portion due to leakage flux entering the winding portion.

(3) According to one aspect of the reactor in (2) above, the relative magnetic permeability of the first core portion is 50 or less, and the relative magnetic permeability of the second core portion is 50 or more.

The reactor can easily adjust inductance.

(4) According to one aspect of the reactor, an iron loss of the second core portion is larger than an iron loss of the first core portion, and a heat conductivity of the second core portion is larger than a heat conductivity of the first core portion.

When iron loss and heat conductivity satisfy the above magnitude relationship, the temperature of the reactor is unlikely to increase. The second core portion has a large iron loss and tends to generate heat but has high heat conductivity and high heat dissipation, whereas the first core portion has low heat conductivity and low heat dissipation but has a small iron loss and tends not to generate heat.

(5) According to one aspect of the reactor, the first core portion is constituted by a compact made of a composite material in which a soft magnetic powder is dispersed in resin, and the second core portion is constituted by a powder compact made of a base powder containing a soft magnetic powder.

Because the first core portion is constituted by a compact made of a composite material and the second core portion is constituted by a powder compact, the reactor can easily adjust inductance without a large gap being interposed between the first core portion and the second core portion, and can easily adjust heat dissipation. Also, because the second core portion is constituted by a powder compact having a comparatively high heat conductivity, the reactor tends to increase heat dissipation.

(6) According to one aspect of the reactor in (5) above, the magnetic core includes a first end core piece and a second end core piece that respectively face end surfaces of the winding portion, a middle core portion having a portion disposed inside the winding portion, and a first side core portion and a second side core portion that are disposed on an outer periphery of the winding portion with the middle core portion interposed therebetween, the first core portion and the second core portion are combined in an axial direction of the winding portion, the first core portion includes the first end core piece and at least one selected from the group consisting of at least a portion of the middle core portion, at least a portion of the first side core portion, and at least a portion of the second side core portion, and the second core portion includes at least the second end core piece, out of the second end core piece, the remaining portion of the middle core portion, the remaining portion of the first side core portion, and the remaining portion of the second side core portion.

The reactor can more easily adjust inductance and heat dissipation. Also, because the reactor can be constructed by combining the first core portion and the second core portion in the axial direction of the winding portion with respect to the winding portion, the reactor has high manufacturing workability.

(7) According to one aspect of the reactor in (6) above, the second core portion includes at least one selected from the group consisting of the remaining portion of the middle core portion, the remaining portion of the first side core portion, and the remaining portion of the second side core portion, a length L1 of the remaining portion of the middle core portion, a length L21 of the remaining portion of the first side core portion, and a length L22 of the remaining portion of the second side core portion are two times or less a length L3 of the second end core piece, the length L1 of the remaining portion of the middle core portion is the length of the remaining portion of the middle core portion in the axial direction of the winding portion, the length L21 of the remaining portion of the first side core portion is the length of the remaining portion of the first side core portion in the axial direction of the winding portion, the length L22 of the remaining portion of the second side core portion is the length of the remaining portion of the second side core portion in the axial direction of the winding portion, and the length L3 of the second end core piece is the length of the second end core piece in the axial direction of the winding portion.

In the reactor, the variation in the density of the second middle core piece, the density of the first side core piece, the density of the second side core piece, and the density of the second end core piece tends to be small. The reasons therefor are as follows. A powder compact is obtained through compression molding of base powder. The direction in which pressure is applied (pressure applying direction) during molding depends on the shape and the size of the powder compact, but is often a direction extending in an axial direction of the second middle core piece. When the length L1, the length L21, and the length L22 are two times or less the length L3, variation in pressure applied to each core piece tends to decrease when the second core portion is molded. Therefore, a second core portion with a small variation in density can be easily produced.

(8) According to one aspect of the reactor in (6) above, the second core portion includes at least one selected from the group consisting of the remaining portion of the middle core portion, the remaining portion of the first side core portion, and the remaining portion of the second side core portion, a length L1 of the remaining portion of the middle core portion, a length L21 of the remaining portion of the first side core portion, and a length L22 of the remaining portion of the second side core portion are more than two times a length L3 of the second end core piece, the length L1 of the remaining portion of the middle core portion is the length of the remaining portion of the middle core portion in the axial direction of the winding portion, the length L21 of the remaining portion of the first side core portion is the length of the remaining portion of the first side core portion in the axial direction of the winding portion, the length L22 of the remaining portion of the second side core portion is the length of the remaining portion of the second side core portion in the axial direction of the winding portion, and the length L3 of the second end core piece is the length of the second end core piece in the axial direction of the winding portion.

The reactor tends to enhance heat dissipation. The reasons therefor are that, when the length L1, the length L21, and the length L22 are more than two times the length L3, the ratio of the second core portion constituted by a powder compact having comparatively high heat conductivity in the magnetic core can be easily increased. The pressure applying direction during molding may also be a direction that is orthogonal to both the axial direction of the middle core pieces and the parallel direction in which two side core pieces are arranged in parallel with each other, instead of the above-described direction extending in the axial direction of the middle core pieces. In this case, the second core portion can have a configuration in which the length L1, the length L21, and the length L22 are more than two times the length L3. Also, if the pressure applying direction during molding is the above orthogonal direction, a notch portion or a chamfered portion can be easily provided in the second core portion during molding.

(9) According to one aspect of the reactor in any one of (6) to (8) above, a shape of the first core portion and a shape of the second core portion are asymmetrical to each other.

In the reactor, because the first core portion and the second core portion have asymmetrical shapes, the choices of the shape of the first core portion and the shape of the second core portion are expanded.

(10) According to one aspect of the reactor of any one of (6) to (9) above, the magnetic core has a gap portion provided between the first core portion and the second core portion, and the gap portion is disposed inside the winding portion.

In the reactor, because the gap portion is formed inside the winding portion, it is possible to more easily reduce eddy current loss occurring in the winding portion due to leakage flux entering the winding portion, compared to a case where the gap portion is formed outside the winding portion.

(11) According to one aspect of the reactor in (10) above, a length of the gap portion in the axial direction of the winding portion is 2 mm or less.

The reactor has little leakage flux, and tends to be more effective in reducing eddy current loss.

(12) A converter according to one aspect of this disclosure includes the reactor according to any one of (1) above to (11) above.

Because the converter includes the reactor, the converter has excellent heat dissipation without increasing the size of the converter.

(13) A power conversion device according to one aspect of this disclosure includes the converter in (12) above.

Because the power conversion device includes the converter, the power conversion device has excellent heat dissipation without increasing the size of the power conversion device.

Details of Embodiments of the Present Disclosure

The following describes embodiments of this disclosure in detail with reference to the drawings. The same reference numerals indicate objects having the same names.

Embodiment 1

Reactor

A reactor 1 according to Embodiment 1 will be described with reference to FIGS. 1 to 3. The reactor 1 includes a coil 2 and a magnetic core 3. The coil 2 includes a winding portion 21. One of the characteristics of the reactor 1 of this embodiment is that the reactor 1 meets the following requirements (a) to (c).

(a) The number of winding portions 21 is a specific number, and the shape of the winding portion 21 is a specific shape.

(b) The magnetic core 3 is an assembly obtained by combining a first core portion 3*f* and a second core portion 3*s*.

(c) The first core portion 3*f* and the second core portion 3*s* are constituted by compacts made of different materials.

The following describes configurations thereof in detail. FIG. 3 shows the coil 2 using two-dot chain lines for convenience of description. The same applies to FIGS. 4 to 6 referred to in Embodiments 2 to 4, which will be described later.

Coil

Figure 2:
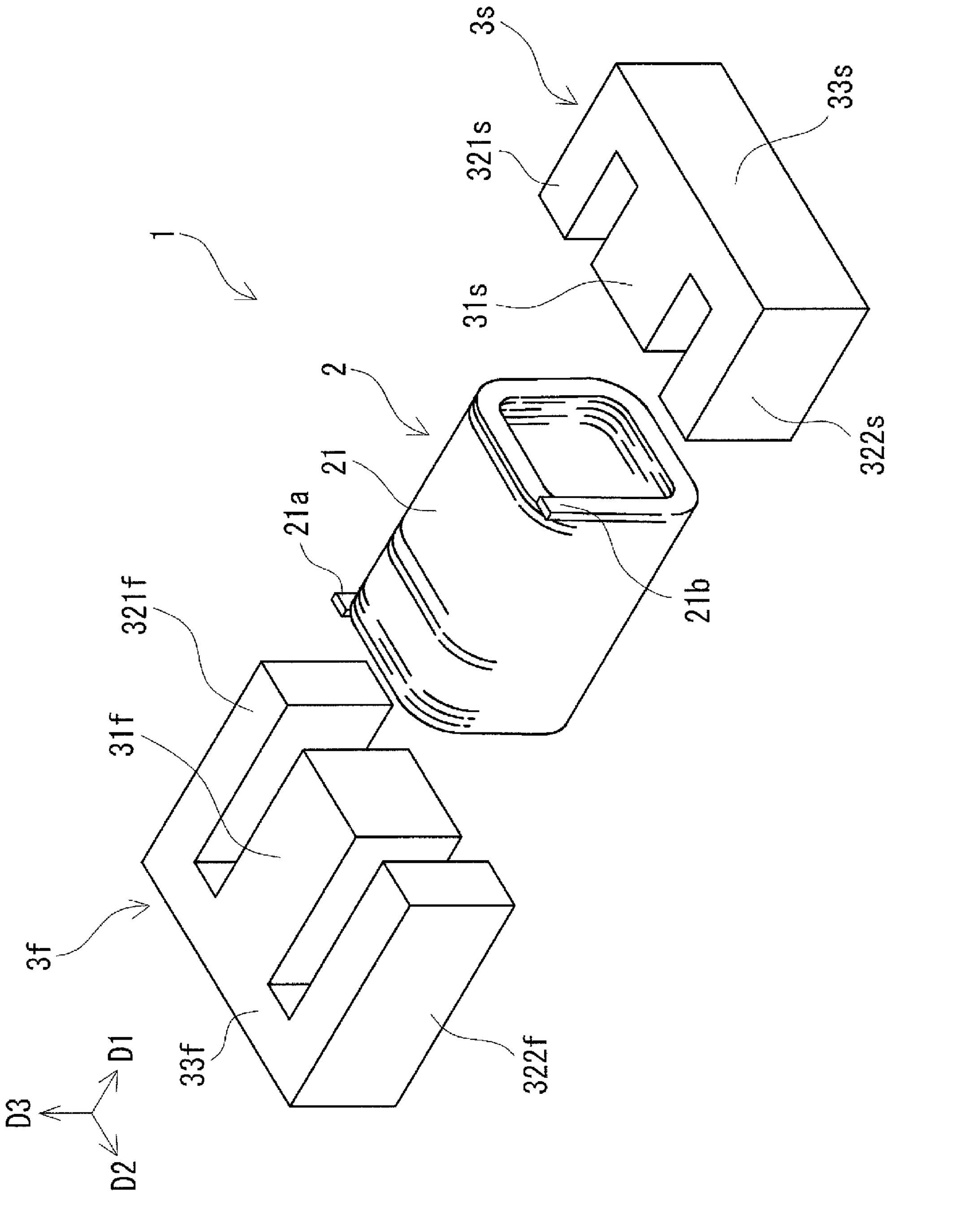
FIG. 2 is an exploded perspective view schematically showing the reactor according to Embodiment 1.

As shown in FIGS. 1 and 2, the coil 2 has a hollow winding portion 21. The number of winding portions 21 is one. Because the number of winding portions 21 is one in the reactor 1 of this embodiment, the length in a second direction D2, which will be described later, can be shortened, compared to a case where a plurality of winding portions are arranged in parallel with each other in a direction that is orthogonal to the axial direction of the winding portion.

As shown in FIG. 2, the winding portion 21 has a rectangular tubular shape. A square is a type of rectangle. That is, the shape of an end surface of the winding portion 21 is a rectangular frame shape. Because the winding portion 21 has a rectangular tubular shape, the contact area between the winding portion 21 and an installation target can be more easily increased, compared to a case where the winding portion has a cylindrical shape having the same cross-sectional area. Thus, the reactor 1 tends to dissipate heat to the installation target via the winding portion 21. Also, the winding portion 21 can be easily installed stably on the installation target. Corner portions of the winding portion 21 are rounded.

The winding portion 21 is obtained by helically winding one winding wire having no joined portion. A known winding wire can be used as the winding wire. A covered flat wire is used as the winding wire of this embodiment. A conductor wire of the covered flat wire can be constituted by a flat wire made of copper. An insulating coating of the covered flat wire is made of enamel. The winding portion 21 is constituted by an edgewise coil obtained by edgewise winding the covered flat wire.

One end portion 21*a* and the other end portion 21*b* of the winding portion 21 are respectively extended toward the outer peripheral surface of the winding portion 21 on one end side and the other end side in the axial direction of the winding portion 21 in this embodiment. Although not shown, the insulating coating is stripped at the one end portion 21*a* and the other end portion 21*b* of the winding portion 21, and the conductor wire is exposed. A terminal member is connected to the exposed conductor wire. The terminal member is not shown. An external device is connected to the coil 2 via this terminal member. The external device is not shown. Examples of the external device include a power source that supplies power to the coil 2.

Magnetic Core

As show in FIG. 1, the magnetic core 3 includes a first end core piece 33*f*, a second end core piece 33*s*, a middle core portion 31, a first side core portion 321, and a second side core portion 322. In the magnetic core 3, the direction extending in the axial direction of the winding portion 21 is a first direction D1, the parallel direction in which the middle core portion 31, the first side core portion 321, and the second side core portion 322 are arranged in parallel is a second direction D2, and a direction that is orthogonal to the first direction D1 and the second direction D2 is a third direction D3.

First End Core Piece/Second End Core Piece

The first end core piece 33*f* faces one of the end surfaces of the winding portion 21. The second end core piece 33*s* faces the other of the end surfaces of the winding portion 21. "Facing" refers to the core piece and the end surface of the winding portion 21 facing each other. As shown in FIGS. 1 and 2, the first end core piece 33*f* and the second end core piece 33*s* have the same thin prism shape.

Middle Core Portion

The middle core portion 31 has a portion disposed inside the winding portion 21. The shape of the middle core portion 31 may be a shape corresponding to the inner peripheral shape of the winding portion 21, and is a square prism shape in this embodiment as shown in FIG. 2. Corner portions of the middle core portion 31 may be rounded so as to follow the inner peripheral surface of the corner portions of the winding portion 21.

Figure 3:
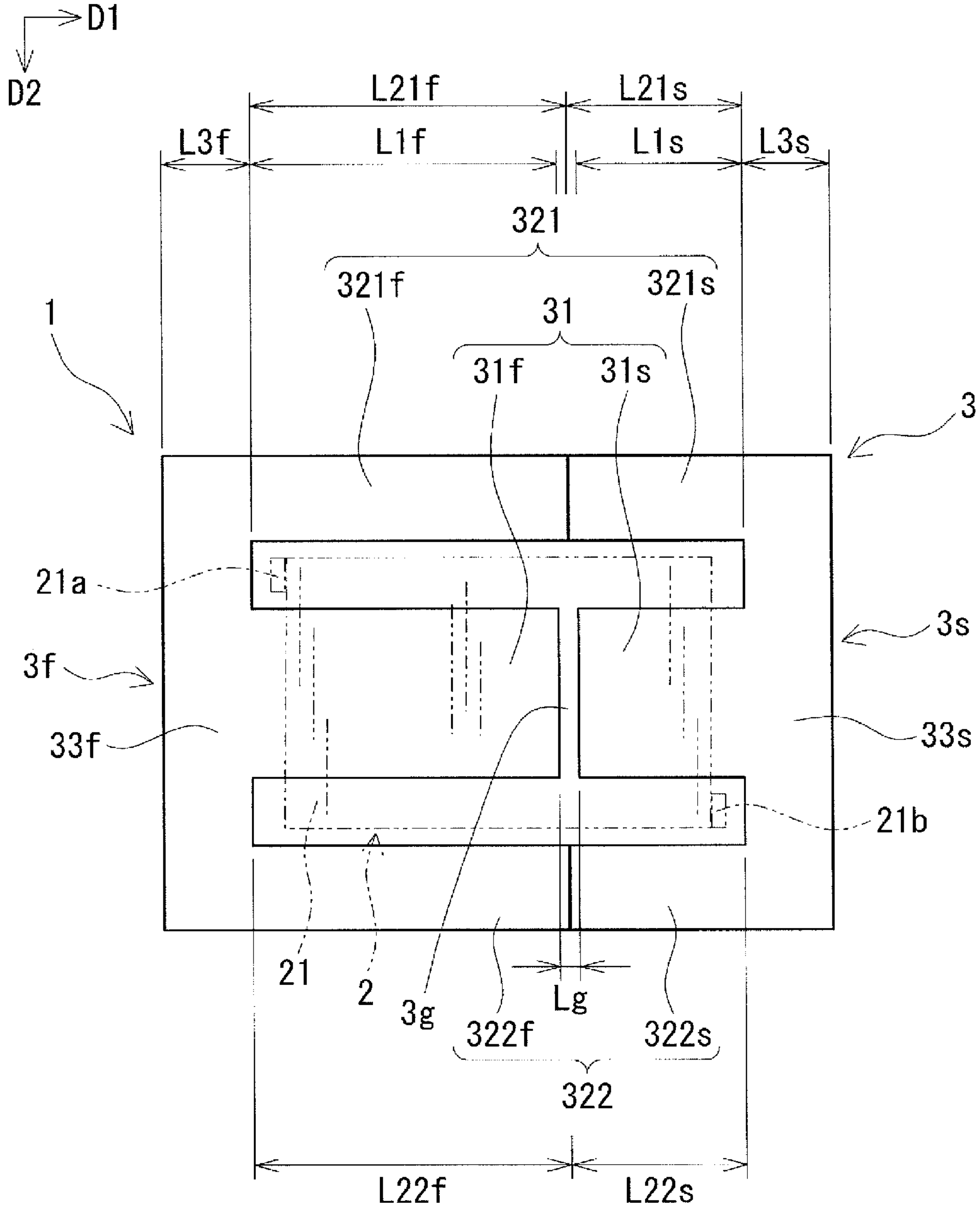
FIG. 3 is a top view schematically showing the entire reactor according to Embodiment 1.

As shown in FIG. 3, the length of the middle core portion 31 in the first direction D1 is equal to the length of the winding portion 21 in the axial direction thereof. The length of the middle core portion 31 in the first direction D1 refers to a total length (L1*f*+L1*s*) of the length L1*f* of the first middle core piece 31*f* and the length L1*s* of the second middle core piece 31*s*, which will be described later. The length of the middle core portion 31 in the first direction D1 does not include a length Lg of a gap portion 3*g* in the first direction D1, which will be described later. The same applies to the length of the other core portions and the core pieces.

The length of the middle core portion 31 in the first direction D1 is shorter than the length of the first side core portion 321 in the first direction D1 and the length of the second side core portion 322 in the first direction D1 in this embodiment. The length of the first side core portion 321 in the first direction D1 refers to a total length (L21*f*+L21*s*) of the length L21*f* of the first side core piece 321*f* and the length L21*s* of the first side core piece 321*s*, which will be described later. The length of the second side core portion 322 in the first direction D1 refers to a total length (L22*f*+L22*s*) of the length L22*f* of the second side core piece 322*f* and the length L22*s* of the second side core piece 322*s*, which will be described later. Note that, unlike this embodiment, the length of the middle core portion 31 in the first direction D1 may be equal to the length of the first side core portion 321 in the first direction D1 and the length of the second side core portion 322 in the first direction D1.

Figure 4:
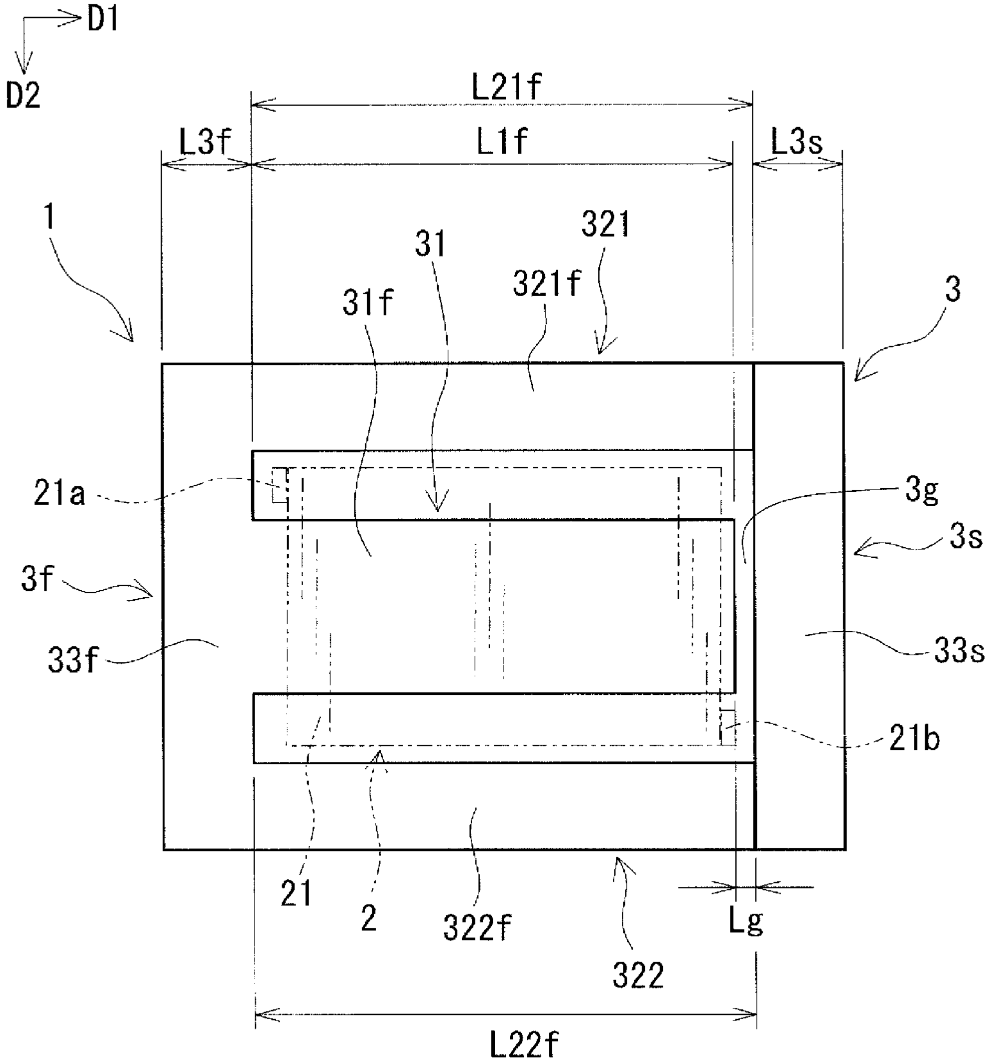
FIG. 4 is a top view schematically showing the entire reactor according to Embodiment 2.
Figure 5:
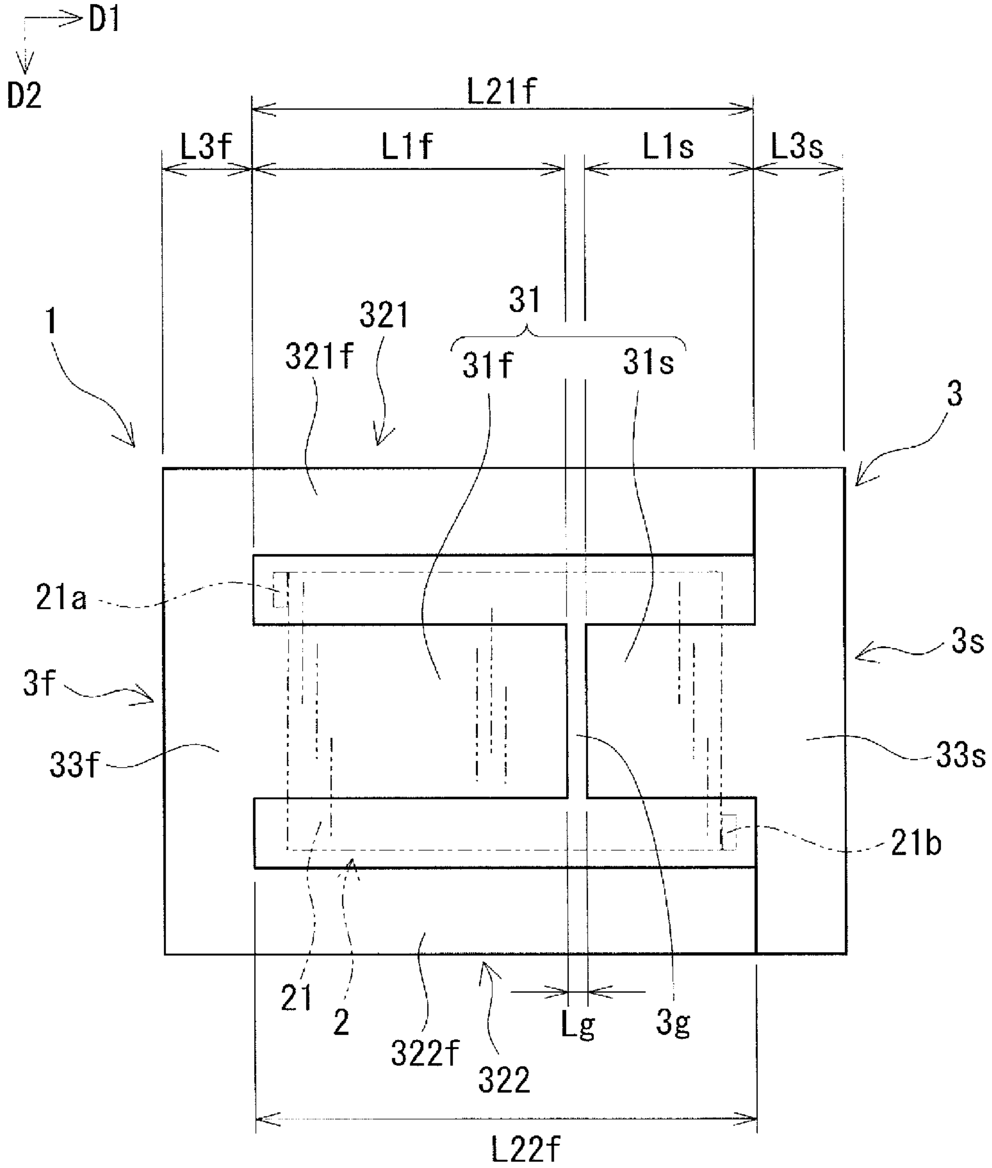
FIG. 5 is a top view schematically showing the entire reactor according to Embodiment 3.
Figure 6:
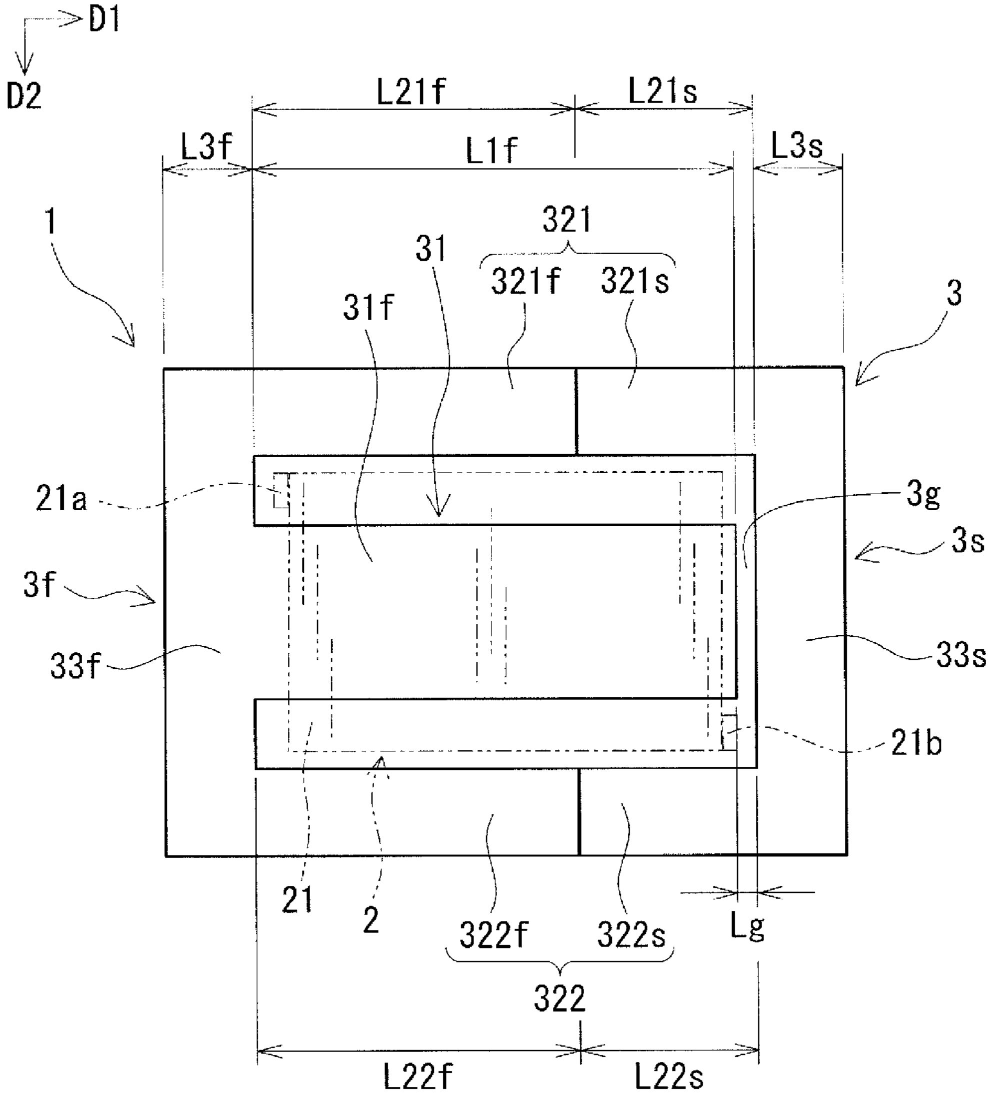
FIG. 6 is a top view schematically showing the entire reactor according to Embodiment 4.

The middle core portion 31 may be constituted by two core pieces, namely, the first middle core piece 31*f* and the second middle core piece 31*s*, as in this embodiment and Embodiment 3, which will be described later with reference to FIG. 5, or may be constituted by one first middle core piece 31*f* as in Embodiment 2, which will be described later with reference to FIG. 4, and Embodiment 4, which will be described later with reference to FIG. 6.

First Side Core Piece/Second Side Core Piece

As shown in FIGS. 1 and 2, the first side core portion 321 and the second side core portion 322 are disposed so as to face each other with the middle core portion 31 interposed therebetween. The first side core portion 321 and the second side core portion 322 are disposed on the outer periphery of the winding portion 21. The first side core portion 321 and the second side core portion 322 have the same thin prism shape.

As shown in FIG. 3, the length of the first side core portion 321 (L21*f*+L21*s*) in the first direction D1 and the length of the second side core portion 322 (L22*f*+L22*s*) in the first direction D1 are longer than the length of the winding portion 21 in the axial direction thereof. Note that the length of the first side core portion 321 in the first direction D1 and the length of the second side core portion 322 in the first direction D1 may be equal to the length of the winding portion 21 in the axial direction thereof.

The first side core portion 321 may be constituted by two core pieces, namely the first side core piece 321*f* and the first side core piece 321*s* as in this embodiment and Embodiment 4, or may be constituted by one first side core piece 321*f* as in Embodiment 2 or 3, for example.

The second side core portion 322 may be constituted by two core pieces, namely the second side core piece 322*f* and the second side core piece 322*s* as in this embodiment and Embodiment 4, or may be constituted by one second side core piece 322*f* as in Embodiment 2 or 3, for example.

In this embodiment, the sum of the cross-sectional area of the first side core portion 321 and the cross-sectional area of the second side core portion 322 is equal to the cross-sectional area of the middle core portion 31. That is, the sum of the length of the first side core portion 321 in the second direction D2 and the length of the second side core portion 322 in the second direction D2 corresponds to the length of the middle core portion 31 in the second direction D2.

The magnetic core 3 is an assembly obtained by combining the first core portion 3*f* and the second core portion 3*s*. The first core portion 3*f* and the second core portion 3*s* can be combined in various manners by selecting the shape of the first core portion 3*f* and the shape of the second core portion 3*s* as appropriate. The shape of the first core portion 3*f* and the shape of the second core portion 3*s* may be symmetrical, but are preferably asymmetrical to each other. "Symmetrical" refers to these core portions having the same shape and the same size. "Asymmetrical" refers to these core portions having different shapes. When the first core portion 3*f* and the second core portion 3*s* have asymmetrical shapes, the choices of the shape of the first core portion 3*f* and the shape of the second core portion 3*s* are expanded. In this embodiment, the shape of the first core portion 3*f* and the shape of the second core portion 3*s* are asymmetrical to each other.

As shown in FIG. 2, the first core portion 3*f* and the second core portion 3*s* are split in the first direction D1 in this embodiment. A combination of the first core portion 3*f* and the second core portion 3*s* is an E-E type in this embodiment. Furthermore, the above combination may be an E-I type as in Embodiment 2. Further, the above combination may be an E-T type as in Embodiment 3. Also, the above combination may be an E-U type as in Embodiment 4. In addition, although not shown, the above combination may be an F-F type, an F-L type, a U-T type, or the like. When the core portions have these combinations, the inductance and heat dissipation can be more easily adjusted. Also, because the reactor 1 can be constructed by combining the first core portion 3*f* and the second core portion 3*s* with respect to the winding portion 21 along the axial direction of the winding portion 21, the reactor 1 has high manufacturing workability.

The gap portion 3*g*, which will be described later, may be provided between the first core portion 3*f* and the second core portion 3*s*, or the gap portion 3*g* need not be provided therebetween.

First Core Portion

The first core portion 3*f* includes at least the first end core piece 33*f*. In addition to the first end core piece 33*f*, the first core portion 3*f* includes at least one selected from the group consisting of at least a portion of the middle core portion 31, at least a portion of the first side core portion 321, and at least a portion of the second side core portion 322.

If the first core portion 3*f* includes the first end core piece 33*f* and at least a portion of the middle core portion 31, for example, the shape of the first core portion 3*f* is a T-shape. If the first core portion 3*f* includes the first end core piece 33*f* and at least a portion of the first side core portion 321 or at least a portion of the second side core portion 322, the shape of the first core portion 3*f* is an L-shape. If the first core portion 3*f* includes the first end core piece 33*f*, at least a portion of the middle core portion 31, and at least a portion of the first side core portion 321 or at least a portion of the second side core portion 322, the shape of the first core portion 3*f* is an F-shape. If the first core portion 3*f* includes the first end core piece 33*f*, at least a portion of the first side core portion 321, and at least a portion of the second side core portion 322, the shape of the first core portion 3*f* is a U-shape. If the first core portion 3*f* includes the first end core piece 33*f*, at least a portion of the middle core portion 31, at least a portion of the first side core portion 321, and at least a portion of the second side core portion 322, the shape of the first core portion 3*f* is an E-shape.

The shape of the first core portion 3*f* in this embodiment is an E-shape. That is, the first core portion 3*f* of this embodiment includes the first end core piece 33*f*, at least a portion of the middle core portion 31, at least a portion of the first side core portion 321, and at least a portion of the second side core portion 322. Specifically, the first core portion 3*f* of this embodiment includes the first end core piece 33*f*, a portion of the middle core portion 31, a portion of the first side core portion 321, and a portion of the second side core portion 322. More specifically, the first core portion 3*f* of this embodiment includes the first end core piece 33*f*, the first middle core piece 31*f*, the first side core piece 321*f*, and the second side core piece 322*f*.

The first core portion 3*f* is a compact in which the first end core piece 33*f*, the first middle core piece 31*f*, the first side core piece 321*f*, and the second side core piece 322*f* form a single body. The first end core piece 33*f* connects the first middle core piece 31*f*, the first side core piece 321*f*, and the second side core piece 322*f* to each other. The first side core piece 321*f* and the second side core piece 322*f* are provided at both ends of the first end core piece 33*f*. The first middle core piece 31*f* is provided in the middle of the first end core piece 33*f*. As described above, the first end core piece 33*f* has a thin prism shape. The first middle core piece 31*f* has a square prism shape. The first side core piece 321*f* and the second side core piece 322*f* have a thin prism shape.

Second Core Portion

Similarly to the first core portion 3*f*, the second core portion 3*s* includes at least the second end core piece 33*s*. In addition to the second end core piece 33*s*, the second core portion 3*s* may have at least one selected from the group consisting of the remaining portion of the middle core portion 31, the remaining portion of the first side core portion 321, and the remaining portion of the second side core portion 322, according to a combination of the first core portion 3*f* and the second core portion 3*s*.

If the second core portion 3*s* is constituted by one second end core piece 33*s*, for example, the second core portion 3*s* has an I-shape. If the second core portion 3*s* includes the second end core piece 33*s* and the remaining portion of the middle core portion 31, the second core portion 3*s* has a T-shape. If the second core portion 3*s* includes the second end core piece 33*s* and the remaining portion of the first side core portion 321 or the remaining portion of the second side core portion 322, the second core portion 3*s* has an L-shape. If the second core portion 3*s* includes the second end core piece 33*s*, the remaining portion of the middle core portion 31, and the remaining portion of the first side core portion 321 or the remaining portion of the second side core portion 322, the second core portion 3s has an F-shape. If the second core portion 3s includes the second end core piece 33s, the remaining portion of the first side core portion 321, and the remaining portion of the second side core portion 322, the second core portion 3s has a U-shape. If the second core portion 3s includes the second end core piece 33s, the remaining portion of the middle core portion 31, the remaining portion of the first side core portion 321, and the remaining portion of the second side core portion 322, the second core portion 3s has an E-shape.

The shape of the second core portion 3s in this embodiment is an E-shape. That is, the second core portion 3s of this embodiment includes the second end core piece 33s, the remaining portion of the middle core portion 31, the remaining portion of the first side core portion 321, and the remaining portion of the second side core portion 322. Specifically, the second core portion 3s of this embodiment includes the second end core piece 33s, the second middle core piece 31s, the first side core piece 321s, and the second side core piece 322s.

The second core portion 3s is a compact in which the second end core piece 33s, the second middle core piece 31s, the first side core piece 321s, and the second side core piece 322s form a single body. The second core portion 33s connects the second middle core piece 31s, the first side core piece 321s, and the second side core piece 322s to each other. The first side core piece 321s and the second side core piece 322s are provided at both ends of the second end core piece 33s. The second middle core piece 31s is provided in the middle of the second end core piece 33s. As described above, the second end core piece 33s has a thin prism shape. The second middle core piece 31s has a square prism shape. The first side core piece 321s and the second side core piece 322s have a thin prism shape.

Size

The first core portion 3f and the second core portion 3s have different sizes. Specifically, the first core portion 3f and the second core portion 3s have portions in which the length of the core pieces of the first core portion 3f in the first direction D1 differs from the length of the core pieces of the second core portion 3s in the first direction D1. The length of the core pieces of the first core portion 3f in the second direction D2 is the same as the length of the core pieces of the second core portion 3s in the second direction D2. The length of the core pieces of the first core portion 3f in the third direction D3 is the same as the length of the core pieces of the second core portion 3s in the third direction D3.

In the first core portion 3f, at least one of the length L1f of the first middle core piece 31f in the first direction D1, the length L21f of the first side core piece 321f in the first direction D1, and the length L22f of the second side core piece 322f in the first direction D1 may differ from the others, or all of the length L1f, the length L21f, and the length L22f may be the same. In this embodiment, the length L21f and the length L22f are the same, and are longer than the length L1f. Note that, in the first core portion 3f, the length L21f and the length L22f are the same, and the length L1f may be longer than the length L21f and the length L22f.

In the second core portion 3s, at least one of the length L1s of the second middle core piece 31s in the first direction D1, the length L21s of the first side core piece 321s in the first direction D1, and the length L22s of the second side core piece 322s in the first direction D1 may differ from the others, or all of the length L1s, the length L21s, and the length L22s may be the same. In this embodiment, the length L21s and the length L22s are the same, and are longer than the length L1s. Note that, in the second core portion 3s, the length L21s and the length L22s are the same, and the length L1s may be longer than the lengths L21s and L22s.

The length L1f and the length L1s may differ from each other as in this embodiment, or, unlike this embodiment, may be the same. In this embodiment, the length L1f is longer than the length L1s.

As described above, the length of the first middle core piece 31f in the second direction D2 is the same as the length of the second middle core piece 31s in the second direction D2. As described above, the length of the first middle core piece 31f in the third direction D3 is the same as the length of the second middle core piece 31s in the third direction D3.

The length L21f and the length L21s may differ from each other as in this embodiment, or, unlike this embodiment, may be the same. In this embodiment, the length L21f is longer than the length L21s.

As described above, the length of the first side core piece 321f of the first core portion 3f in the second direction D2 is the same as the length of the first side core piece 321s of the second core portion 3s in the second direction D2. As described above, the length of the first side core piece 321f of the first core portion 3f in the third direction D3 that is the same as the length of the first side core piece 321s of the second core portion 3s in the third direction D3.

The length L22f and the length L22s may differ from each other as in this embodiment, or, unlike this embodiment, may be the same. In this embodiment, the length L22f is longer than the length L22s. As described above, the length of the second side core piece 322f of the first core portion 3f in the second direction D2 is the same as the length of the second side core piece 322s of the second core portion 3s in the second direction D2. As described above, the length of the second side core piece 332f of the first core portion 3f in the third direction D3 is the same as the length of the second side core piece 322s of the second core portion 3s in the third direction D3.

As shown in FIG. 3, the length L3f of the first end core piece 33f in the first direction D1 and the length L3s of the second end core piece 33s in the first direction D1 are the same.

As shown in FIG. 3, the length of the first end core piece 33f in the second direction D2 and the length of the second end core piece 33s in the second direction D2 are the same, and are longer than the length of the winding portion 21 in the second direction D2.

As shown in FIG. 1, the length of the first end core piece 33f in the third direction D3 and the length of the second end core piece 33s in the third direction D3 are the same, and are shorter than the length of the winding portion 21 in the third direction D3. The length of the first end core piece 33f in the third direction D3 and the length of the second end core piece 33s in the third direction D3 may be longer than or the same as the length of the winding portion 21 in the third direction D3.

As will be described later, the second core portion 3s is constituted by a powder compact in this embodiment. If the second core portion 3s is constituted by a powder compact, the length L1s, the length L21s, and the length L22s may be two times or less or more than two times the length L3s. A powder compact is obtained through compression molding of base powder. The direction in which pressure is applied during molding depends on the shape and the size of the powder compact, and examples thereof include a direction extending in the first direction D1 and a direction extending in the third direction D3.

When the pressure applying direction during molding extends in the first direction D1, if the length L1*s*, the length L21*s*, and the length L22*s* are two times or less the length L3*s*, variation in pressure applied to each core piece when molding the second core portion 3*s* tends to decrease. Thus, the variation in the density of the second middle core piece 31*s*, the density of the first side core piece 321*s*, the density of the second side core piece 322*s*, and the density of the second end core piece 33*s* tends to be small. When the pressure applying direction during molding extends in the first direction D1, the length L1*s*, the length L21*s*, and the length L22*s* are preferably 1.8 times or less the length L3*s*, and particularly preferably 1.6 times or less the length L3*s*. The length L1*s*, the length L21*s*, and the length L22*s* are one or more times the length L3*s*, for example.

When the pressure applying direction during molding extends in the third direction D3, it is possible to manufacture the second core portion 3*s* in which the length L1*s*, the length L21*s*, and the length L22*s* are two times or less the length L3*s*, and it is also possible to manufacture the second core portion 3*s* in which these lengths are more than two times the length L3*s*. When the length L1*s*, the length L21*s*, and the length L22*s* are more than two times the length L3*s*, the ratio of the second core portion 3*s* constituted by a powder compact having a comparatively high heat conductivity in the magnetic core 3 can be easily increased, and thus the reactor 1 tends to enhance heat dissipation. Also, when the pressure applying direction during molding extends in the third direction D3, compared to a case where the pressure applying direction during molding extends in the first direction D1, a notch or a chamfered portion can be more easily provided in the second core portion 3*s* during molding. When the pressure applying direction during molding extends in the third direction D3, the length L1*s*, the length L21*s*, and the length L22*s* can be set to more than 2.5 times the length L3*s*, and in particular, can be set to more than 3 times the length L3*s*. The length L1*s*, the length L21*s*, and the length L22*s* are five times or less the length L3*s*, for example.

In this embodiment, the length L1*s*, the length L21*s*, and the length L22*s* are two times or less the length L3*s*.

The first core portion 3*f* and the second core portion 3*s* are combined such that an end surface of the first side core piece 321*f* and an end surface of the second side core piece 322*f* of the first core portion 3*f* and an end surface of the first side core piece 321*s* and an end surface of the second side core piece 322*s* of the second core portion 3*s* are respectively in contact with each other. When the first core portion 3*f* and the second core portion 3*s* are combined in this manner, the above relationship regarding length is satisfied. Therefore, a space is provided between the end surface of the first middle core piece 31*f* of the first core portion 3*f* and the end surface of the second end core piece 33*s* of the second core portion 3*s*. The length of this space extending in the first direction D1 corresponds to the length Lg of the gap portion 3*g*.

Of course, the first core portion 3*f* and the second core portion 3*s* may be combined such that a space is respectively provided between an end surface of the first side core piece 321*f* and an end surface of the second side core piece 322*f* of the first core portion 3*f* and an end surface of the first side core piece 321*s* and an end surface of the second side core piece 322*s* of the second core portion 3*s*. When the first core portion 3*f* and the second core portion 3*s* are combined in this manner, the above relationship regarding length is satisfied. Therefore, a space is also provided between the end surface of the first middle core piece 31*f* and the end surface of the second end core piece 31*s*. The space between the end surface of the first middle core piece 31*f* and the end surface of the second middle core piece 31*s* is larger than the space between the end surface of the first side core piece 321*f* and the end surface of the first side core piece 321*s*, and the space between the end surface of the second side core piece 322*f* and the end surface of the second side core piece 322*s*. In this case, the first core portion 3*f* and the second core portion 3*s* may be combined using a molded resin portion, which will be described later. The gap portion is constituted by the molded resin portion with which the space is filled.

Magnitude Relationship Regarding Relative Magnetic Permeability

It is preferable that the first core portion 3*f* and the second core portion 3*s* satisfy "relative magnetic permeability of the first core portion 3*f*<relative magnetic permeability of the second core portion 3*s*". When the first core portion 3*f* and the second core portion 3*s* satisfy the magnitude relationship regarding relative magnetic permeability, the reactor 1 can easily adjust the inductance without a large gap portion 3*g* being interposed between the first core portion 3*f* and the second core portion 3*s*. Also, because the reactor 1 need not have a gap portion 3*g* having a long length Lg between the first core portion 3*f* and the second core portion 3*s*, eddy current loss occurring in the winding portion 21 due to leakage flux entering the winding portion 21 can be easily reduced. The gap portion 3*g* having the long length Lg refers to a gap portion having a length of more than 2 mm, for example.

Having satisfied the above magnitude relationship regarding relative magnetic permeability, the relative magnetic permeability of the first core portion 3*f* is preferably 50 or less, and the relative magnetic permeability of the second core portion 3*s* is preferably 50 or more. The reason therefor is that inductance can be easily adjusted. The relative magnetic permeability of the first core portion 3*f* is preferably 45 or less, more preferably 40 or less, and particularly preferably 30 or less. The relative magnetic permeability of the first core portion 3*f* is preferably 5 or more, and more preferably 15 or more, for example. The relative magnetic permeability of the second core portion 3*s* is preferably 100 or more, and particularly preferably 150 or more. The relative magnetic permeability of the second core portion 3*s* is preferably 500 or less, and more preferably 300 or less, for example.

Magnitude Relationships Regarding Iron Loss and Heat Conductivity

It is preferable that the first core portion 3*f* and the second core portion 3*s* satisfy "iron loss of the first core portion 3*f* <iron loss of the second core portion 3*s*" and "heat conductivity of the first core portion 3*f*<heat conductivity of the second core portion 3*s*". When these magnitude relationships are satisfied, the temperature of the reactor 1 is less likely to increase. This is because the second core portion 3*s* has a large iron loss and tends to generate heat but has high heat conductivity and high heat dissipation, whereas the first core portion 3*f* has low heat conductivity and low heat dissipation but has a small iron loss and tends not to generate heat.

The difference between the heat conductivity of the first core portion 3*f* and the heat conductivity of the second core portion 3*s* is preferably 1 w/mK or more, more preferably 3 w/mK or more, and particularly preferably 5 w/mK or more, for example. The difference in heat conductivity is 20 w/mK or less, for example. The heat conductivity of the first core portion 3*f* is preferably 1 w/mK or more, more preferably 2 w/mK or more, and particularly preferably 3 w/mK or more, for example. The heat conductivity of the first core portion 3*f* is, for practical purposes, 5 w/mK or less, for example. The heat conductivity of the second core portion 3*s* is preferably 5 w/mK or more, more preferably 10 w/mK or more, and particularly preferably 15 w/mK or more, for example. The heat conductivity of the second core portion 3*s* is, for practical purposes, 20 w/mK or less, for example.

The relative magnetic permeability is obtained as follows. Ring-shaped measurement samples are respectively cut out from the first core portion and the second core portion. Each measurement sample is wound by a winding wire with 300 turns on the primary side and 20 turns on the secondary side. The B-H initial magnetization curve is measured in a range of H=0 (Oe) or more and 100 (Oe) or less, and the maximum value of the slopes of the B-H initial magnetization curve is obtained. This maximum value is regarded as the relative magnetic permeability. Note that a magnetization curve here refers to a so-called DC magnetization curve.

Iron loss is obtained as follows using the measurement samples. A BH curve tracer is used to measure iron loss ($W/m^3$) at an excitation magnetic flux density Bm of 1 kG (=0.1 T) and a measurement frequency of 10 kHz.

The heat conductivity can be obtained through measurement performed on the first core portion and the second core portion using a temperature gradient method or a laser flash method.

Materials

The first core portion 3*f* and the second core portion 3*s* are constituted by compacts made of different materials. Different materials refer to materials having different relative magnetic permeabilities. Examples of a compact include a powder compact and a compact made of a composite material. Even when the first core portion 3*f* and the second core portion 3*s* are constituted by powder compacts, if the materials or content of the soft magnetic powder that constitutes the powder compacts are different from each other, it is regarded that the first core portion 3*f* and the second core portion 3*s* are constituted by different materials, for example. Also, even when the first core portion 3*f* and the second core portion 3*s* are constituted by compacts made of composite materials, if the materials of at least one of the soft magnetic powder and resin that constitute the composite materials differs from the others, or if the materials of the soft magnetic powder and the resin are the same but the content of the soft magnetic powder and the resin differ from each other, it is regarded that the first core portion 3*f* and the second core portion 3*s* are made of different materials. Note that these core pieces may be constituted by a laminate.

A powder compact is obtained through compression molding of soft magnetic powder. The powder compact can further increase the ratio of the soft magnetic powder in the core piece, compared to a composite material. Therefore, the powder compact tends to increase magnetic characteristics. Examples of the magnetic characteristics include relative magnetic permeability and saturation magnetic flux density. Also, the powder compact contains a smaller amount of resin and a larger amount of soft magnetic powder than the compact made of a composite material, and thus the powder compact has excellent heat dissipation. The content of the magnetic powder in the powder compact is 85 vol % or more and 99.99 vol % or less, for example. This content refers to a value when the content of the powder compact is 100 vol %.

The composite material is obtained by dispersing soft magnetic powder in resin. The composite material can be obtained by filling a mold with a flowable material in which soft magnetic powder is dispersed in unsolidified resin, and curing the resin. As for the composite material, the content of the soft magnetic powder in resin can be easily adjusted. Therefore, the magnetic characteristics can be easily adjusted using the composite material. Further, a complicated shape can be more easily formed using the composite material, compared to a powder compact. The content of the soft magnetic powder in the compact made of the composite material is 20 vol % or more and 80 vol % or less, for example. The content of the resin in the compact made of the composite material is 20 vol % or more and 80 vol % or less, for example. This content refers to a value when the content of the composite material is 100 vol %.

A laminate is obtained by laminating a plurality of thin magnetic plates. The thin magnetic plates have an insulating coating film. An example of the thin magnetic plates is an electrical steel sheet.

Examples of particles that constitute the soft magnetic powder include soft magnetic metal particles, coated particles in which an insulating coating is provided on outer peripheries of soft magnetic metal particles, and soft magnetic nonmetal particles. Examples of the soft magnetic metal include pure iron and iron-based alloys. Examples of the iron-based alloy include Fe—Si alloys and Fe—Ni alloys. An insulating coating is made of phosphate or the like. Examples of soft nonmetal include ferrites.

A thermosetting resin or a thermoplastic resin can be used as a resin in the composite material, for example. Examples of the thermosetting resin include an epoxy resin, a phenolic resin, a silicone resin, and a urethane resin. Examples of the thermoplastic resin include a polyphenylene sulfide resin, a polyamide resin, a liquid crystal polymer, a polyimide resin, and a fluororesin. Examples of the polyamide resin include nylon 6, nylon 66, and nylon 9T.

These resins may contain ceramic filler. Examples of the ceramic filler include alumina filler and silica filler. A resin containing such ceramic filler has excellent heat dissipation and electrical insulation.

The content of the soft magnetic powder in a powder compact or in a compact made of a composite material is considered to be equivalent to the area ratio of the soft magnetic powder in a cross-section of the compact. The content of the soft magnetic powder in the compact is obtained as follows. Observation images are acquired by observing cross-sections of the compact using an SEM (scanning electron microscope). The magnification in an SEM is 200× or more and 500× or less. The number of observation images acquired is ten or more. The total cross-sectional area is 0.1 $cm^2$ or more. One observation image may be acquired for each cross-section, or multiple observation images may be acquired for each cross-section. The contours of particles are extracted by subjecting the acquired observation images to image processing. An example of the image processing is binarization. The area ratio of the soft magnetic particles in each observation image is calculated, and the average of the area ratios is obtained. The obtained average is regarded as the content of the soft magnetic powder.

In this embodiment, the first core portion 3*f* is constituted by a compact made of a composite material, and the second core portion 3*s* is constituted by a powder compact. Because the first core portion 3*f* is constituted by a compact made of a composite material and the second core portion 3*s* is constituted by a powder compact, it is possible to easily adjust inductance without a gap portion 3*g* having a long length Lg being interposed between the first core portion 3*f* and the second core portion 3*s*, and easily adjust heat dissipation. Also, because the second core portion 3*s* is constituted by a powder compact having a comparatively high heat conductivity, the reactor 1 can easily increase heat dissipation.

Gap Portion

The gap portion 3*g* may be an air gap as in this embodiment, or may be constituted by a member made of a material whose relative magnetic permeability is smaller than that of the first core portion 3*f* and the second core portion 3*s*.

The gap portion 3*g* is located at least one of outside the winding portion 21 and inside the winding portion 21. That is, in the magnetic core 3 of this embodiment, the gap portion 3*g* is located in at least one of a position between the first side core piece 321*f* and the first side core piece 321*s*, a position between the second side core piece 322*f* and the second side core piece 322*s*, and a position between the first middle core piece 31*f* and the second middle core piece 31*s*. It is preferable that the gap portion 3*g* is located inside the winding portion 21 as in this embodiment. That is, the gap portion 3*g* is preferably provided between the first middle core piece 31*f* and the second middle core piece 31*s*. Because the gap portion 3*g* is formed inside the winding portion 21, it is possible to more easily reduce eddy current loss occurring in the winding portion 21 due to leakage flux entering the winding portion 21, compared to a case where the gap portion is provided outside the winding portion 21.

The length Lg of the gap portion 3*g* extending in the first direction D1 is preferably 2 mm or less, for example. If a plurality of gap portions 3*g* are provided, the length Lg refers to the length of one gap portion 3*g*. That is, the total of the lengths Lg of the plurality of gap portions 3*g* may be more than 2 mm as long as the length Lg of each gap portion 3*g* is 2 mm or less. In particular, the length Lg of the gap portion 3*g* located inside the winding portion 21 extending in the first direction D1 is preferably 2 mm or less. When the length Lg is 2 mm or less, the reactor has little leakage flux, and tends to be more effective in reducing eddy current loss. The length Lg is preferably 1.5 mm or less, and particularly preferably 1.0 mm or less. The length Lg is 0.1 mm or more, for example. The length Lg is more preferably 0.3 mm or more. When the length Lg is 0.1 mm or more, more preferably 0.3 mm, or particularly preferably 0.5 mm or more, a predetermined inductance can be easily ensured.

Other Matters

Although not shown, the reactor 1 may include at least one of a case, an adhesive layer, a holding member, and a molded resin portion. The case accommodates an assembly of the coil 2 and the magnetic core 3. The assembly accommodated in the case may be embedded in a sealing resin portion. The adhesive layer fixes the assembly to a mounting surface, the assembly to an inner bottom surface of the case, and the case to the mounting surface, or the like. The holding member is provided between the coil 2 and the magnetic core 3 so as to ensure insulation between the coil 2 and the magnetic core 3. The molded resin portion covers the outer periphery of the assembly and is provided between the coil 2 and the magnetic core 3 so as to form the coil 2 and the magnetic core 3 into a single body.

Effects

The reactor 1 of this embodiment can adjust inductance without increasing the length Lg of the gap portion 3*g* between the first core portion 3*f* and the second core portion 3*s*. Further, the reactor 1 of this embodiment can easily adjust and enhance heat dissipation. This is because the magnetic core 3 of the reactor 1 of this embodiment is an assembly obtained by combining the first core portion 3*f* constituted by a compact made of a composite material and the second core portion 3*s* constituted by a powder compact. Also, the reactor 1 of this embodiment can be suitably used for a reactor that is cooled by a cooling member having uneven cooling performance The second core portion 3*s* having high heat dissipation is disposed on the side where the cooling member has low cooling performance, and the first core portion 3*f* having lower heat dissipation is disposed on the side where the cooling member has high cooling performance. As a result, the first core portion 3*f* and the second core portion 3*s* are evenly cooled, and the highest temperature of the magnetic core 3 is reduced. Because the highest temperature of the magnetic core 3 is reduced in this manner, the reactor 1 has low loss. Further, the reactor 1 tends not to increase in size. This is because heat dissipation can be easily adjusted and increased as described above, and thus the reactor 1 need not be provided with a cooling pipe as in the above-described conventional reactor.

Embodiment 2

Reactor

A reactor 1 according to Embodiment 2 will be described with reference to FIG. 4. The reactor 1 of this embodiment differs from the reactor 1 according to Embodiment 1 in that the combination of the first core portion 3*f* and the second core portion 3*s* is an E-I type. The following mainly describes the differences from Embodiment 1. The same configuration as that of Embodiment 1 will not be described. The same applies to Embodiments 3 and 4, which will be described later.

Magnetic Core

The magnetic core 3 includes a first end core piece 33*f* and a second end core piece 33*s* that are similar to those of Embodiment 1, a middle core portion 31, a first side core portion 321, and a second side core portion 322 that differ from those of Embodiment 1. Similarly to Embodiment 1, the length L1*f* of the middle core portion 31 in the first direction D1 is shorter than the length L21*f* of the first side core portion 321 in the first direction D1 and the length L22*f* of the second side core portion 322 in the first direction DE The middle core portion 31 is constituted by one first middle core piece 31*f*. The first side core portion 321 is constituted by one first side core piece 321*f*. The second side core portion 322 is constituted by one second side core piece 322*f*. Similarly to Embodiment 1, the first core portion 3*f* and the second core portion 3*s* are asymmetrical to each other.

First Core Portion

The shape of the first core portion 3*f* is an E-shape. The first core portion 3*f* is a compact in which the first end core piece 33*f*, the first middle core piece 31*f*, the first side core piece 321*f*, and the second side core piece 322*f* form a single body. The length L21*f* of the first side core piece 321*f* in the first direction D1 and the length L22*f* of the second side core piece 322*f* in the first direction D1 are the same, and are longer than the length L1*f* of the first middle core piece 31*f* in the first direction D1. The length L21*f* and the length L22*f* of this embodiment are respectively longer than the length L21*f* and the length L22*f* of Embodiment 1, and are longer than the length of the winding portion 21 in the axial direction thereof. Similarly to Embodiment 1, the first core portion 3*f* is constituted by a compact made of a composite material.

Second Core Portion

The shape of the second core portion 3*s* is an I-shape. The second core portion 3*s* is constituted by the second end core piece 33*s*. Similarly to Embodiment 1, the second core portion 3*s* is constituted by a powder compact.

The first core portion 3*f* and the second core portion 3*s* are combined such that an end surface of the first side core piece **321*f* and an end surface of the second side core piece 322*f*** of the first core portion 3*f* are in contact with an end surface of the second end core piece **33*s*** of the second core portion 3*s*. When the first core portion 3*f* and the second core portion 3*s* are combined in this manner, the above relationship regarding length is satisfied. Therefore, a space is provided between the end surface of the first middle core piece **31*f*** of the first core portion 3*f* and the end surface of the second core piece **33*s***.

The magnitude relationship regarding relative magnetic permeability, the magnitude relationship regarding iron loss, and the magnitude relationship regarding heat conductivity between the first core portion 3*f* and the second core portion 3*s* are the same as in Embodiment 1.

Gap Portion

Similarly to Embodiment 1, the gap portion **3*g* is constituted by an air gap. Unlike Embodiment 1, the gap portion 3*g* is located between the end surface of the first middle core piece 31*f* and the end surface of the second end core piece 33*s*, and is located outside the winding portion 21. Similarly to Embodiment 1, the length Lg of the gap portion 3*g* extending in the first direction D1** is 2 mm or less.

Effects

Similarly to the reactor 1 according to Embodiment 1, the reactor 1 according to this embodiment can easily adjust inductance and heat dissipation without increasing the size of the reactor 1. Because the gap portion **3*g* is disposed outside the winding portion 21, the reactor 1 of this embodiment tends to be less effective in reducing eddy current loss due to a reduction in leakage flux, but the first core portion 3*f* and the second core portion 3*s* can be more easily combined, compared to the reactor 1 according to Embodiment 1. This is because the second core portion 3*s* does not have a core piece facing the end surface of the first middle core piece 31*f* in the winding portion 21. Also, density distribution is less likely to occur in the second core portion 3*s* in the reactor 1 of this embodiment, compared to the reactor 1 according to Embodiment 1. This is because the second core portion 3*s* is constituted by only the second end core piece 33*s*, and thus pressure applied when molding the second core portion 3*s*** is unlikely to vary.

Embodiment 3

Reactor

A reactor 1 according to Embodiment 3 will be described with reference to FIG. 5. The reactor 1 of this embodiment differs from the reactor 1 according to Embodiment 1 in that the combination of the first core portion **3*f* and the second core portion 3*s*** is an E-T type.

Magnetic Core

The magnetic core 3 includes a first end core piece **33*f*, a second end core piece 33*s*, and a middle core portion 31 that are similar to those of Embodiment 1, and a first side core portion 321 and a second side core portion 322 that differ from those of Embodiment 1. Similarly to Embodiment 1, the length of the middle core portion 31 (L1*f*+L1*s*) in the first direction D1 is shorter than the length L21*f* of the first side core portion 321 in the first direction D1 and the length L22*f* of the second side core portion 322 in the first direction D1. The first side core portion 321 is constituted by one first side core piece 321*f*. The second side core portion 322 is constituted by one second side core piece 322*f*. Similarly to Embodiment 1, the first core portion 3*f* and the second core portion 3*s*** are asymmetrical to each other.

First Core Portion

The shape of the first core portion **3*f* is an E-shape. The first core portion 3*f* is a compact in which the first end core piece 33*f*, the first middle core piece 31*f*, the first side core piece 321*f*, and the second side core piece 322*f* form a single body. The length L21*f* of the first side core piece 321*f* in the first direction D1 and the length L22*f* of the second side core piece 322*f* in the first direction D1 are the same, and are longer than the length L1*f* of the first middle core piece 31*f* in the first direction D1. The length L21*f* and the length L22*f* of this embodiment are respectively longer than the length L21*f* and the length L22*f* of Embodiment 1, and are longer than the length in the axial direction of the winding portion 21. Also, the length L1*f* may differ from the length L1*s* of the later-described second middle core piece 31*s* in the first direction D1 as in this embodiment, or, unlike this embodiment, may be the same as the length L1*s*. The length L1*f* of this embodiment is similar to the length L1*f* of Embodiment 1, and is longer than the length L1*s* of this embodiment. Similarly to Embodiment 1, the first core portion 3*f*** is constituted by a compact made of a composite material.

Second Core Portion

The shape of the second core portion **3*s* is a T-shape. The second core portion 3*s* is a compact in which the second end core piece 33*s* and the second middle core piece 31*s* form a single body. As described above, the length L1*s* of this embodiment is similar to the length L1*s* of Embodiment 1, and is shorter than the length L1*f* of this embodiment. Similarly to Embodiment 1, the length L1*s* is two times or less the length L3*s*. Similarly to Embodiment 1, the second core portion 3*s*** is constituted by a powder compact.

The first core portion **3*f* and the second core portion 3*s* are combined such that an end surface of the first side core piece 321*f* and an end surface of the second side core piece 322*f* of the first core portion 3*f* are in contact with an end surface of the second end core piece 33*s* of the second core portion 3*s*. When the first core portion 3*f* and the second core portion 3*s* are combined in this manner, the above relationship regarding length is satisfied. Therefore, a space is provided between the end surface of the first middle core piece 31*f* of the first core portion 3*f* and the end surface of the second end core piece 31*s* of the second core portion 3*s***.

The magnitude relationship regarding relative magnetic permeability, the magnitude relationship regarding iron loss, and the magnitude relationship regarding heat conductivity between the first core portion **3*f* and the second core portion 3*s*** are the same as in Embodiment 1.

Gap Portion

Similarly to Embodiment 1, the gap portion **3*g* is constituted by an air gap. Similarly to Embodiment 1, the gap portion 3*g* is located inside the winding portion 21 between the end surface of the first middle core piece 31*f* and the end surface of the second middle core piece 31*s*. Similarly to Embodiment 1, the length Lg of the gap portion 3*g* extending in the first direction D1** is 2 mm or less.

Effects

Similarly to the reactor 1 according to Embodiment 1, the reactor 1 according to this embodiment can easily adjust inductance and heat dissipation without increasing the size of the reactor 1.

Embodiment 4

Reactor

A reactor 1 according to Embodiment 4 will be described with reference to FIG. 6. The reactor 1 of this embodiment differs from the reactor 1 according to Embodiment 1 in that the combination of the first core portion 3*f* and the second core portion 3*s* is an E-U type.

Magnetic Core

The magnetic core 3 includes a first end core piece 33*f*, a second end core piece 33*s*, a first side core portion 321, and a second side core portion 322 that are similar to those of Embodiment 1, and a middle core portion 31 that differs from that of Embodiment 1. Similarly to Embodiment 1, the length L1*f* of the middle core portion 31 in the first direction D1 is shorter than the length of the first side core portion 321 (L21*f*+L21*s*) in the first direction D1 and the length of the second side core portion 322 (L22*f*+L22*s*) in the first direction D1. The middle core portion 31 is constituted by one first middle core piece 31*f*. Similarly to Embodiment 1, the first core portion 3*f* and the second core portion 3*s* are asymmetrical to each other.

First Core Portion

The shape of the first core portion 3*f* is an E-shape. The first core portion 3*f* is a compact in which the first end core piece 33*f*, the first middle core piece 31*f*, the first side core piece 321*f*, and the second side core piece 322*f* form a single body.

The length L21*f* of the first side core piece 321*f* in the first direction D1 and the length L22*f* of the second side core piece 322*f* in the first direction D1 are the same. The length L1*f* of the first middle core piece 31*f* in the first direction D1 is longer than the lengths L21*f* and L22*f*.

The length L21*f* and the length L22*f* may respectively differ from the length L21*s* of the first side core piece 321*s* of the later-described second core portion 3*s* in the first direction D1 and the length L22*s* of the second side core piece 322*s* in the first direction D1, or, unlike this embodiment, may be respectively the same as the length L21*s* and the length L22*s*. The length L21*f* and the length L22*f* of this embodiment are respectively similar to the length L21*f* and the length L22*f* of Embodiment 1, and are respectively longer than the length L21*s* and the length L22*s* of this embodiment. The length L1*f* is longer than the length L1*f* of Embodiment 1, and is equal to the length in the axial direction of the winding portion 21. Similarly to Embodiment 1, the first core portion 3*f* is constituted by a compact made of a composite material.

Second Core Portion

The shape of the second core portion 3*s* is a U-shape. The second core portion 3*s* is a compact in which the second end core piece 33*s*, the first side core piece 321*s*, and the second side core piece 322*s* form a single body. As described above, the length L21*s* and the length L22*s* of this embodiment are similar to the length L21*s* and the length L22*s* in Embodiment 1, and are shorter than the length L21*f* and the length L22*f* of this embodiment. Similarly to Embodiment 1, the length L21*s* and the length L22*s* are two times or less the length L3*s*. Similarly to Embodiment 1, the second core portion 3*s* is constituted by a powder compact.

The first core portion 3*f* and the second core portion 3*s* are combined such that an end surface of the first side core piece 321*f* and an end surface of the second side core piece 322*f* of the first core portion 3*f* and an end surface of the first side core piece 321*s* and an end surface of the second side core piece 322*s* of the second core portion 3*s* are respectively in contact with each other. When the first core portion 3*f* and the second core portion 3*s* are combined in this manner, the above relationship regarding length is satisfied. Therefore, a space is provided between the end surface of the first middle core piece 31*f* of the first core portion 3*f* and the end surface of the second end core piece 33*s* of the second core portion 3*s*.

The magnitude relationship regarding relative magnetic permeability, the magnitude relationship regarding iron loss, and the magnitude relationship regarding heat conductivity between the first core portion 3*f* and the second core portion 3*s* are the same as in Embodiment 1.

Similarly to Embodiment 1, the gap portion 3*g* is constituted by an air gap. Unlike Embodiment 1, the gap portion 3*g* is located between the end surface of the first middle core piece 31*f* and the end surface of the second end core piece 33*s*, and is located outside the winding portion 21. Similarly to Embodiment 1, the length Lg of the gap portion 3*g* extending in the first direction D1 is 2 mm or less.

Effects

Similarly to the reactor 1 according to Embodiment 1, the reactor 1 according to this embodiment can easily adjust inductance and heat dissipation without increasing the size of the reactor 1. Because the gap portion 3*g* is disposed outside the winding portion 21, the reactor 1 of this embodiment tends to be less effective in reducing eddy current loss due to a reduction in leakage flux, but the first core portion 3*f* and the second core portion 3*s* can be more easily combined, compared to the reactor 1 according to Embodiment 1. This is because the second core portion 3*s* does not have a core piece facing the end surface of the first middle core piece 31*f* in the winding portion 21.

Embodiment 5

Converter and Power Conversion Device

The reactors 1 according to Embodiments 1 to 4 can be used in applications in which the following power supply conditions are satisfied. As for the power supply conditions, the maximum direct current is about 100 A or more and about 1000 A or less, the average voltage is about 100 V or more and about 1000 V or less, and the use frequency is about 5 kHz or more and about 100 kHz or less. The reactors 1 according to Embodiments 1 to 4 are typically utilized as constituent parts of a converter mounted in a vehicle such as an electric car or a hybrid car, and constituent parts of a power conversion device provided with this converter.

Figure 7:
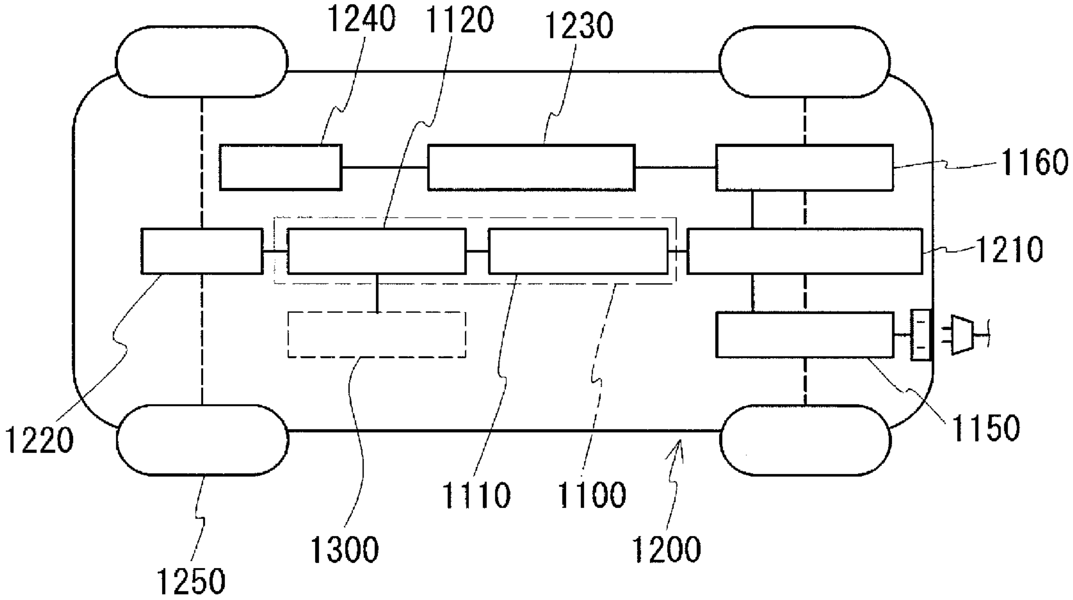
FIG. 7 is a configuration diagram schematically showing a power supply system of a hybrid car.

As shown in FIG. 7, a vehicle 1200 such as a hybrid car and an electric car includes a main battery 1210, a power conversion device 1100 connected to the main battery 1210, and a motor 1220 that is driven by power supplied from the main battery 1210 and is used for traveling. Typically, the motor 1220 is a three-phase AC motor, and functions to drive the wheels 1250 during traveling, and functions as a generator during regeneration. In the case of a hybrid car, the vehicle 1200 includes an engine 1300 in addition to the motor 1220. Although FIG. 7 shows an inlet as a portion for charging the vehicle 1200, a configuration may be adopted in which a plug is provided.

The power conversion device 1100 includes a converter 1110 connected to the main battery 1210, and an inverter 1120 that is connected to the converter 1110 and performs interconversion between DC and AC. While the vehicle 1200 is traveling, the converter 1110 shown in this example steps up the input voltage of the main battery 1210 that is in a range of about 200 V or more and about 300 V or less to a range of about 400 V or more and about 700 V or less, and supplies the voltage to the inverter 1120. During regeneration, the converter 1110 steps down input voltage that is output from the motor 1220 via the inverter 1120 to direct voltage that is compatible with the main battery 1210 and charges the main battery 1210. The input voltage is direct voltage. While the vehicle 1200 is traveling, the inverter 1120 converts DC that is stepped up by the converter 1110 to a predetermined AC and supplies the predetermined AC to the motor 1220, and during regeneration, the inverter 1120 converts AC that is output from the motor 1220 to DC and outputs the DC to the converter 1110.

Figure 8:
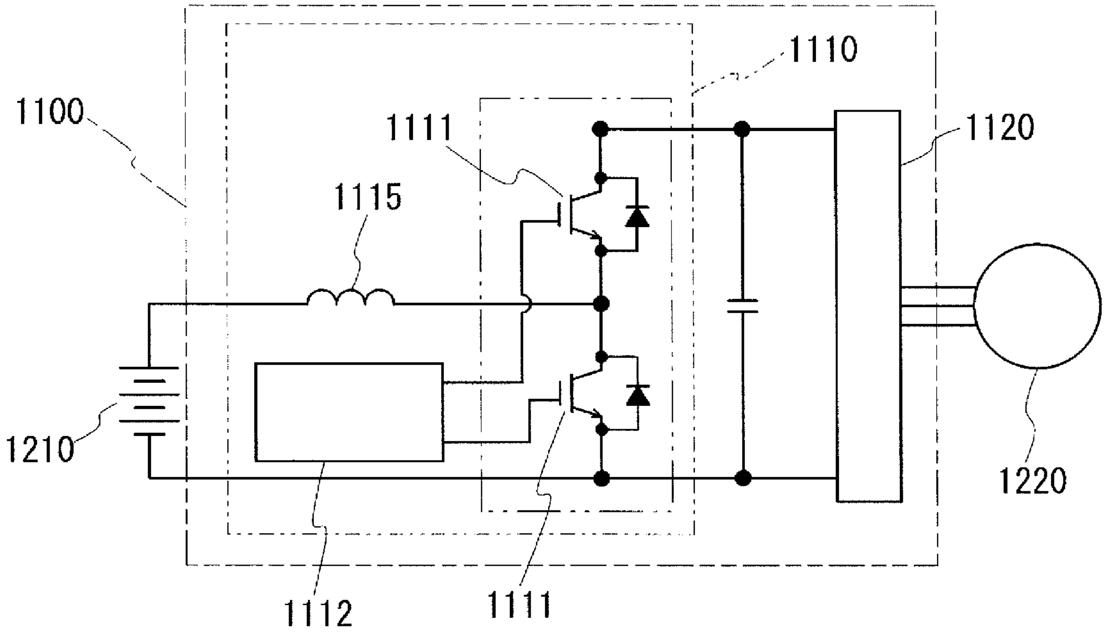
FIG. 8 is a circuit diagram schematically showing an example of a power conversion device provided with a converter.

As shown in FIG. 8, the converter 1110 includes a plurality of switching elements 1111, a drive circuit 1112 that controls operation of the switching elements 1111, and a reactor 1115, and converts the input voltage by repeating ON/OFF. Conversion of the input voltage refers to stepping up/down the input voltage here. Power devices such as field effect transistors and insulated-gate bipolar transistors are used as the switching elements 1111. When a current attempts to increase or decrease through switching operation, the reactor 1115 functions to smooth a change in the current that flows through a circuit, using the property of a coil that attempts to prevent the change in the current. The reactor 1 according to any one of Embodiments 1 to 4 is included as the reactor 1115. As a result of the reactor 1 having excellent heat dissipation without increasing the size thereof or the like being provided, it is expected that the size of the power conversion device 1100 and the converter 1110 can be reduced and heat dissipation thereof can be improved.

In addition to the converter 1110, the vehicle 1200 includes a converter 1150 for a power supply device that is connected to the main battery 1210, and a converter 1160 for an auxiliary power source that is connected to a sub-battery 1230 serving as the power source of auxiliary equipment 1240 and the main battery 1210 and that converts a high voltage of the main battery 1210 to a low voltage. The converter 1110 typically performs DC-DC conversion, whereas the converter 1150 for a power supply device and the converter 1160 for an auxiliary power source performs AC-DC conversion. The converter 1150 for a power supply device may perform DC-DC conversion. A reactor that has the same configuration as the reactor 1 according to any one of Embodiments 1 to 4 and has a different size, shape, or the like as appropriate can be used as a reactor for the converter 1150 for a power supply device and the converter 1160 for an auxiliary power source. The reactor 1 according to any one of Embodiments 1 to 4 or the like can also be used for a converter that performs conversion of input power and performs only step-up operation, or a converter that performs conversion of the input power and performs only step-down operation.

The present invention is not limited to these examples, but is indicated by the claims, and all changes that come within the meaning and range of equivalency of the claims are intended to be embraced therein.

LIST OF REFERENCE NUMERALS

1 Reactor
2 Coil
21 Winding portion
21*a* One end portion
21*b* Other end portion
3 Magnetic core
3*f* First core portion
3*s* Second core portion
31 Middle core portion
31*f* First middle core piece
31*s* Second middle core piece
321 First side core portion
321*f* First side core piece
321*s* First side core piece
322 Second side core portion
322*f* Second side core piece
322*s* Second side core piece
33*f* First end core piece
33*s* Second end core piece
3*g* Gap portion
D1 First direction
D2 Second direction
D3 Third direction
L1*f*, L1*s*, L21*f*, L21*s*, L22*f*, L22*s*, L3*f*, L3*s*, Lg Length
1100 Power conversion device
1110 Converter
1111 Switching element
1112 Drive circuit
1115 Reactor
1120 Inverter
1150 Converter for power supply device
1160 Converter for auxiliary power source
1200 Vehicle
1210 Main battery
1220 Motor
1230 Sub-battery
1240 Auxiliary equipment
1250 Wheel
1300 Engine

What is claimed is:

1. A reactor comprising:
a coil; and
a magnetic core,
wherein the coil includes a winding portion,
the winding portion has a rectangular tubular shape,
the magnetic core is an assembly obtained by combining a first core portion and a second core portion,
the first core portion and the second core portion are constituted by compacts made of different materials,
the first core portion is constituted by a compact made of a composite material in which a soft magnetic metal powder is dispersed in resin,
the second core portion is constituted by a powder compact made of a base powder containing a soft magnetic metal powder,
each of the soft magnetic metal powder of the first core portion and the soft magnetic metal powder of the second core portion includes at least one of pure iron and an iron-based alloy,
a content of the soft magnetic metal powder in the compact made of the composite material is 20 vol % or more,
the first core portion includes two side core pieces at opposite ends of a first end core piece and a first middle core piece between the two side core pieces of the first core portion,
the second core portion includes two side core pieces at opposite ends of a second end core piece and a second middle core piece between the two side core pieces of the second core portion,
a length L1*f* of the first middle core piece is longer than a length L1*s* of the second middle core piece, and
the powder compact of the second core portion contains a smaller amount of resin and a larger amount of soft magnetic powder than the compact made of the composite material of the first core portion.

2. The reactor according to claim 1,
wherein the first end core piece and the second end core piece respectively face end surfaces of the winding portion,
a middle core portion has a portion disposed inside the winding portion and includes the first middle core piece and the second middle core piece, and a first side core portion and a second side core portion are disposed on an outer periphery of the winding portion with the middle core portion interposed therebetween, the first side core portion includes one of the two side core pieces of the first core portion and one of the two side core pieces of the second core portion, the second side core portion includes the other of the two side core pieces of the first core portion and the other of the two side core pieces of the second core portion, the first core portion and the second core portion are combined in an axial direction of the winding portion, the first core portion includes the first end core piece, and at least one selected from the group consisting of at least a portion of the middle core portion, at least a portion of the first side core portion, and at least a portion of the second side core portion, and the second core portion includes at least the second end core piece, out of the second end core piece, the remaining portion of the middle core portion, the remaining portion of the first side core portion, and the remaining portion of the second side core portion.

3. The reactor according to claim 2, wherein the second core portion includes at least one selected from the group consisting of the remaining portion of the middle core portion, the remaining portion of the first side core portion, and the remaining portion of the second side core portion, and a length L1 of the remaining portion of the middle core portion, a length L21 of the remaining portion of the first side core portion, and a length L22 of the remaining portion of the second side core portion are two times or less a length L3 of the second end core piece.

4. The reactor according to claim 2, wherein a shape of the first core portion and a shape of the second core portion are asymmetrical to each other.

5. The reactor according to claim 1, wherein a relative magnetic permeability of the first core portion is smaller than a relative magnetic permeability of the second core portion.

6. The reactor according to claim 5, wherein the relative magnetic permeability of the first core portion is 50 or less, and the relative magnetic permeability of the second core portion is 50 or more.

7. The reactor according to claim 1, wherein an iron loss of the second core portion is larger than an iron loss of the first core portion, and a heat conductivity of the second core portion is larger than a heat conductivity of the first core portion.

8. A converter comprising:

the reactor according to claim 1.

9. A power conversion device comprising:

the converter according to claim 8.

10. The reactor according to claim 1, wherein the content of the soft magnetic metal powder in the compact made of the composite material is 20 vol % or more and 80 vol % or less, with respect to 100 vol % of the composite material, and a content of the soft magnetic metal powder in the powder compact is 85 vol % or more and 99.99 vol % or less, with respect to 100 vol % of the powder compact.

11. A reactor comprising:

a coil; and a magnetic core, wherein the coil includes a winding portion, the winding portion has a rectangular tubular shape, the magnetic core is an assembly obtained by combining a first core portion and a second core portion, the magnetic core includes a first end core piece and a second end core piece that respectively face end surfaces of the winding portion, a middle core portion having a portion disposed inside the winding portion, and a first side core portion and a second side core portion that are disposed on an outer periphery of the winding portion with the middle core portion interposed therebetween, the first core portion and the second core portion are combined in an axial direction of the winding portion, the first core portion is constituted by a compact made of a composite material in which a soft magnetic metal powder is dispersed in resin, the first core portion has an E-shape having the first end core piece, a portion of the middle core portion, the first side core portion, and the second side core portion, the second core portion is constituted by a powder compact made of a base powder containing a soft magnetic metal powder, and the second core portion has a T-shape having the second end core piece and the remaining portion of the middle core portion, a length L21*f* of the first side core portion and a length L22*f* of the second side core portion are the same, and are longer than a length L1*f* of the portion of the middle core portion, a length L1*s* of the remaining portion of the middle core portion is shorter than the length L1*f* of the portion of the middle core portion, and is two times or less a length L3*s* of the second end core piece, each of the soft magnetic metal powder of the first core portion and the soft magnetic metal powder of the second core portion includes at least one of pure iron and an iron-based alloy, and the content of the soft magnetic metal powder in the compact made of the composite material is 20 vol % or more, the powder compact of the second core portion contains a smaller amount of resin and a larger amount of soft magnetic powder than the compact made of the composite material of the first core portion.

12. The reactor according to claim 11, wherein the magnetic core has a gap portion provided between the first core portion and the second core portion, and the gap portion is disposed inside the winding portion.

13. The reactor according to claim 12, wherein a length of the gap portion in the axial direction of the winding portion is 2 mm or less.

14. The reactor according to claim 11, wherein a relative magnetic permeability of the first core portion is smaller than a relative magnetic permeability of the second core portion.

* * * * *